Figure 1:
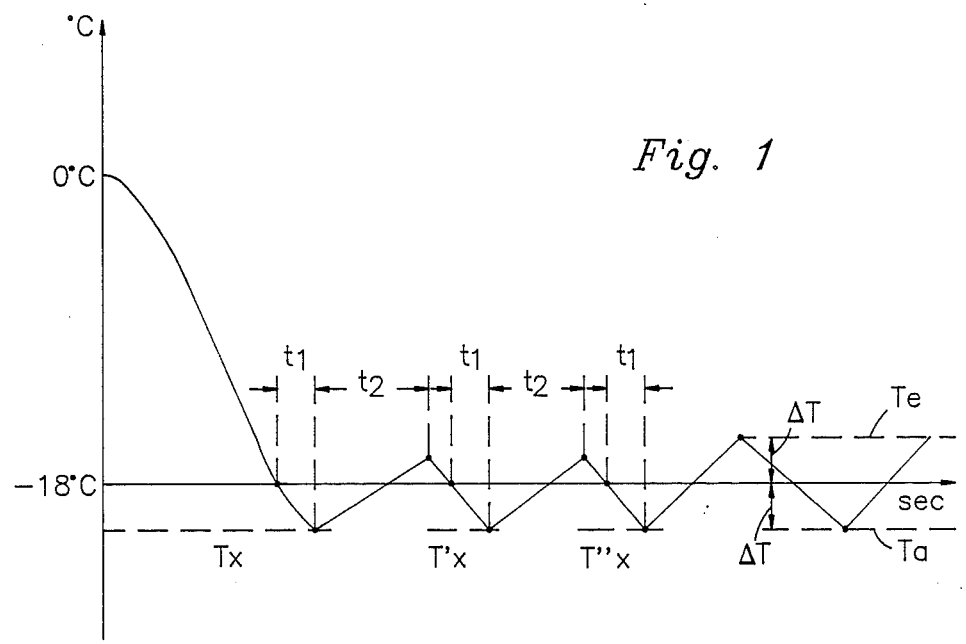

United States Patent [19]

Meyer

[11] Patent Number: 4,934,593
[45] Date of Patent: Jun. 19, 1990

[54] PROCESS FOR SETTING THE TEMPERATURE DIFFERENCE BETWEEN CUT-IN AND CUT-OUT TEMPERATURE OF A REFRIGERATING UNIT OR THE LIKE IN THE REGION OF A SET VALUE, TO BE MAINTAINED, OF THE TEMPERATURE

[76] Inventor: Friedhelm Meyer, Hof Geisenberg, D-5920 Bad Berleburg 11, Fed. Rep. of Germany

[21] Appl. No.: 309,770

[22] Filed: Feb. 10, 1989

[30] Foreign Application Priority Data

Feb. 11, 1988 [DE] Fed. Rep. of Germany ....... 3804258

[51] Int. Cl.$^5$ ................................................ F23N 5/20
[52] U.S. Cl. ................................. 236/46 R; 236/78 D
[58] Field of Search ............ 236/78 D, 46 R; 165/26, 165/27, 12; 364/557

[56] References Cited

U.S. PATENT DOCUMENTS 4,257,318  3/1981  Johannsen ..................... 236/78 D X
4,325,225  4/1982  Price ............................. 236/78 D X
4,373,663  2/1983  Hammer ....................... 236/78 D X Primary Examiner—William E. Wayner
Attorney, Agent, or Firm—Austin R. Miller

[57] ABSTRACT

With a process for setting the temperature difference between cut-in temperature and cut-out temperature of a heating unit or, in particular, of a refrigerating unit in the region of a set value, to be maintained, of the temperature of a medium or of a room, for automatic adaptation of the temperature difference between cut-in temperature and cut-out temperature to changing loads, the temperature which, starting from the set value, is reached by the unit below or above the set value after expiry of a preselected unit of time in each case being established repeatedly, whereupon these established temperatures are compared and that temperature which coincides with several previously measured temperatures is used for setting the temperature difference between cut-in temperature and cut-out temperature.

6 Claims, 1 Drawing Sheet

PROCESS FOR SETTING THE TEMPERATURE DIFFERENCE BETWEEN CUT-IN AND CUT-OUT TEMPERATURE OF A REFRIGERATING UNIT OR THE LIKE IN THE REGION OF A SET VALUE, TO BE MAINTAINED, OF THE TEMPERATURE

The invention relates to a process for setting the temperature difference between cut-in temperature and cut-out temperature of a refrigerating unit or the like in the region of a set value, to be maintained, of the temperature in a refrigerating room or the like.

For the operation of a refrigerating plant, a set value of a temperature, to be maintained for example in the refrigerating room, is preselected, the refrigerating unit being cut in in each case as soon as the temperature in the refrigerating room rises by a certain amount above the set value, in order to bring the room temperature back to the set value, while the refrigerating unit is cut out whenever the room temperature drops by a certain amount below the set value. This temperature difference between cut-in temperature and cut-out temperature is set by an installation engineer, the basis on which this temperature difference is arranged being that of a usual refrigerating load, to be expected, of the refrigerating room. If, however, the refrigerating load changes, for example by introducing more refrigerated goods into the refrigerating room than usual, or by introducing very little refrigerating goods in the refrigerating room, the temperature difference once set between cut-in temperature and cut-out temperature no longer corresponds to the actual requirements.

The invention is based on a process, by means of which the temperature difference between cut-in temperature and cut-out temperature, and consequently the switching frequency of the unit, is adapted automatically to changing loads.

It has now been discovered that by comparing the temperature values in the refrigerating room which are reached below the preselected set value by the refrigerating unit in a preselected unit of time in each case, a condition can be established which is becoming stable and is dependent on the respective load of the refrigerating room. This temperarture value is retained as upper and lower limit above and below the set value for the cutting-in and cutting-out of the refrigerating unit. In this way, the switching frequency of the unit is automatically adapted to the load existing.

Advantageous developments of the invention are specified in the appended claims and in the following description.

Figure 2:
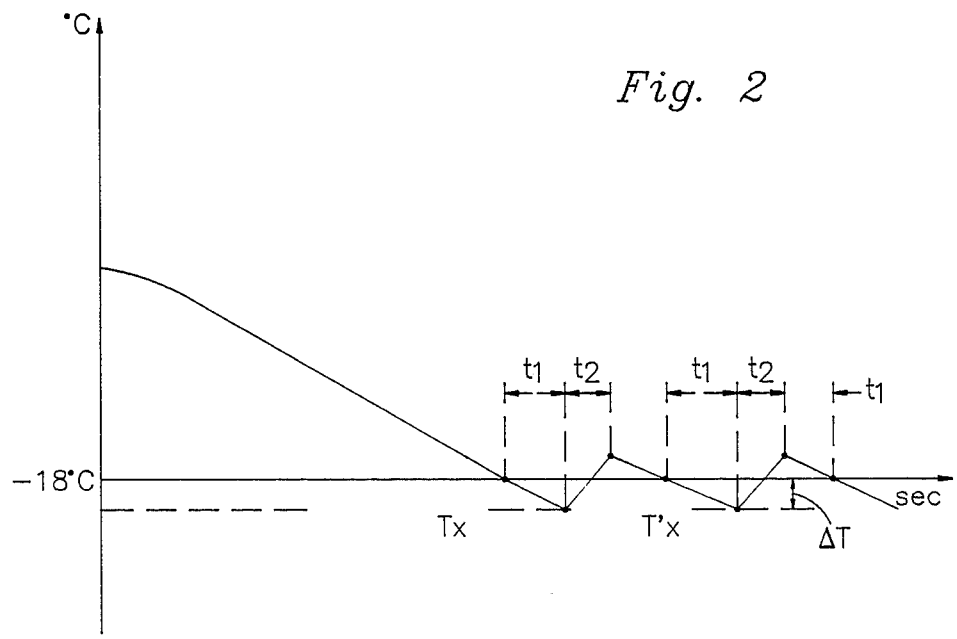

An exemplary embodiment of the invention is explained in more detail below with reference to the drawings, in which:

FIG. 1 shows the temperature profile in a refrigerating room over time, with low load, FIG. 2 shows, in a corresponding representation, the temperature profile with high load, and FIG. 3 is a flow diagram illustrating the operation of the process.

In the following, an example is made of a refrigerating unit which is initially cut out for the defrosting of ice which has formed on the evaporator and is cut in again once the final defrosting temperature of, for example, 10° C., has been reached, in order to restore and retain the preselected set value of, for example, −18° C. in the refrigerating room in which the refrigerating unit is arranged.

Usually, there is arranged in the room to be refrigerated a temperature sensor, which supplies the temperature profile in the cooling room, which is reproduced in FIGS. 1 and 2.

After completion of the defrosting phase, at the left hand ordinate in FIG. 1, the cooling unit is cut in, whereupon, after a certain time, the preselected set value of −18° C. is reached. As soon as the temperature in the refrigerating room has reached the set value of (for example) −18° C., a time $t_1$ is set running by a timer, after the expiry of whiich the temperature determined by the temperature sensor is tested. This temperature $T_x$ tested at the end of $t_1$ time interval lies a certain amount below the set value of −18° C. The measured temperature $T_x$ is stored in an electronic system. At the same time, the refrigerating unit is cut out by the electronic control system, so that the temperature at the temperature sensor rises again.

With the cutting out of the refrigerating unit, a time $t_2$ is set running, upon the expiry of which it is tested at the temperature sensor whether the temperature has reached or exceeded the set value. If the temperature determined upon expiry of $t_2$ lies above the set value, the refrigerating unit is cut in again, so that the temperature at the temperature sensor drops again. As soon as the set value at the temperature sensor is determined, the time $t_1$ is once again set running and, when it expires, the temperature at the temperature sensor is tested. If, for example, a temperature $T'_x$ below the set value is measured, this temperature $T'_x$ is stored and compared with the previously measured temperature $T_x$. At the same time, the refrigerating unit is cut out again and the time $t_2$ is set running.

If the comparison shows that $T_x$ equals $T'_x$, both temperatures $T_x$ and $T'_x$ are stored, whereupon after expiry of $t_2$ it is once again tested whether the temperature has reached or exceeded the set value. If this is the case, the refrigerating unit is cut in again, whereupon, once thee set value has been reached, once again the time $t_1$ is set running and, upon its expiry, the temperature at the temperature sensor is tested. The temperature $T_x$ below the set value is again stored and compared with the two previous temperatures $T_x$ and $T'_x$. If the comparison shows that all three temperatures are equal, it is derived from this that a stable state has been established in the refrigerating room. The testing cycle is broken off and the temperature difference $\Delta T$ between the set value and $T_x$ is determined, whereupon the temperature difference above and below the set value is fixed as a limit value for the cutting in and cutting out of the refrigerating unit, as is indicated in FIG. 1 by broken lines above and below the set value at $T_e$ and $T_a$. Once the refrigerating unit has been cut out upon determination of $T''_x$, the temperature at the temperature sensor again rises after a certain time above the set value, whereupon however tthe refrigerating unit is only cut in again once the upper limit value $T_e$ has been reached, which value lies above the set value by the amount $\Delta T$. During the further course of the refrigerating operation, the refrigerating unit is only cut out again when the lower limit value $T_a$ is determined at the temperature sensor, which value lies below the set value by the amount $\Delta T$. The temperarture difference of $2\Delta T$ between cut-in temperature and cut-out temperature $T_e$ and $T_a$ on either side of the set value is retained until the next defrosting operation of the refrigerating unit or until the next operating change, whereupon, upon new commencement of a further operating phase of the refrigerating unit, the operation described is repeated, to determine once again the temperature difference $2\Delta T$ and to fix it for further operation.

If, in the comparison of the temperature $T''_x$ with the two preceding temperatures $T_x$ and $T'_x$ it is found, for example, that $T''_x$ is less than or greater than the preceding values, the preceding temperatures $T_x$ and $T'_x$ are erased in the memory of the electronic control system, only the value $T''_x$ being retained in the memory. Hereupon, the test operation is repeated, starting from the temperature $T''_x$, until a sequence of three equal temperatures $T_x$ is determined. As long as three successive values $T_x$ are not equal, it is assumed that still no stable state has come about in the refrigerating room. Instead of three successive values $T_x$, two or four or more may also be required, which have to be equal to confirm a stable state and to fix the temperature difference $2\Delta T$.

In the case of a refrigerating unit, usually a restart inhibit is provided in the form of a time-lag relay which, after cutting out the unit, allows a renewed cutting in only when a predetermined time of, for example, 180 seconds, has elapsed. By such a restart inhibit, the motor of the refrigerating unit is protected against damage due to excessive switching frequency. The time $t_2$ specified in the case of the above example must therefore be greater than or equal to the time of, for example, 180 seconds of the restart inhibit.

Instead of a preselected time $t_2$, it is also possible after expiry of the restart inhibit of, for example 180 seconds, to inquire at short intervals of time after expiry of $t_1$ the temperature at the temperature sensor, whereupon the refrigerating unit is cut in again as soon as a temperature at or above the set value is determined.

The time $t_1$ can, for example, be set at 300 seconds. It is, however, also possible to fix $t_1$ at, for example, 180 s, the minimum running time specified by the unit manufacturer having to be taken into account.

With a determined temperature value $T_x$, a tolerance limit of, for example, $+/-0.5°$ C., within which a following measured value $T'_x$ or $T''_x$ is regarded as equal to $T_x$, is expediently preselected. If, with the second or third measurement, the comparison value lies outside the tolerance of $+/-0.5°$ C., for example caused by load variations of the refrigerating room the previously described sequence of three measurements is recommenced with the last comparison value.

While, with a low refrigerating load, a relatively large $\Delta T$ is obtained after expiry of $t_1$, with great cooling load, a small $\Delta T$ is obtained after expiry of $t_1$, as is evident from a comparison of FIGS. 1 and 2, FIG. 1 reproducing approximately the temperature profile with low cooling load and FIG. 2 the temperature profile with high cooling load. Accordingly, the temperature difference between cut-in temperature $T_e$ and cut-out temperature $T_a$ is set by the described process as a function of the load state of the refrigerating unit, and consequently the switching frequency of the refrigerating unit is also adapted to the load state. In contrast to this, in the prior art the temperature difference between cut-in temperature $T_e$ and cut-out temperature $T_a$ is set by the plant constructor as he feels appropriate, this fixed temperature difference if anything corresponding approximately to one operating state, but not to the varying operating states occurring during the operation of a refrigerating plant.

The automatic adaptation of the temperature difference between cut-in temperature and cut-out temperature and of the switching frequency to the load state is appropriately carried out in the case of a refrigerating plant after each defrosting operation, which, experience shows, finishes every 8 to 24 hours.

With frequently changing refrigerating load, the control process described is not employed, rather only if approximately steady temperature states exist over lengthy periods of time. This is usually the case after defrosting in refrigerating plants.

Since, in the case of a refrigerating unit, pressure on the suction side of the compressor is dependent on the temperature in the evaporator, it is also possible to perform a pressure measurement which is equivalent to a temperature measurement in the evaporator and to carry out the previously described control process on the basis of the electric signal supplied by the pressure sensor, the electric signal supplied by the pressure sensor corresponding substantially to the profile of the temperature signal in FIGS. 1 and 2. Measurement of pressure equivalent to temperature is included within the meaning of "temperature" as used in the appended claims.

The control process has been described with reference to a refrigerating unit, but it is also possible to control a heating unit in the same way, in particular in conjunction with a heat pump, the temperature difference between cut-in temperature and cut-out temperature of the heating unit being set as a function of the heating load existing. In this case, the measured temperature values $T_x$ lie above a preselected set value, as the cut-out temperature $T_a$ also lies above the set value and the cut-in temperature $T_e$ lies below the set value. Once again, a room temperature or media temperature can be tested, stored and compared, as is also the case with a refrigerating unit.

In the case of the monitoring of media temperature, for example, the water temperature in a boiler or the oil temperature in an oil cooler can be measured in conjunction with a heat pump.

If, for example, in the case of a refrigerating unit, an unchangeable temperature difference is set by the plant constructor between cut-in temperature and cut-out temperature, and the refrigerating load in the refrigerating room designed for a certain capacity is considerably below the usual load, to which the temperature difference between cut-in temperature and cut-out temperature was originally matched, the refrigerating unit is cut in and cut out at short intervals of time because, once $T_e$ has been reached, the limit value $T_a$ is reached more quickly due to the inadequate refrigerating load. In such a case, the refrigerating unit may be cut in and cut out up to the switching frequency limit and beyond. On the other hand, by the control process described, a new, greater temperature difference between cut-in and cut-out temperature is determined, at the latest after a defrosting operation, so that the switching frequency is reduced automatically.

It is also possible, for example, to monitor the switching frequency of the refrigerating unit in its limit range and to introduce the test cycle described whenever a high switching frequency is determined, so that it is not necessary to wait for a defrosting operation. In the same way, it is possible to introduce the test cycle if there is another change in the load state of the unit, or to test the state at certain intervals of time and to recommence the test cycle if there is a change in the operating state.

I claim:

1. Process for setting the temperature difference between cut-in temperature and cut-out temperature of a heating unit or, in particular, of a refrigerating unit, in the region of a set value, to be maintained, of the temperature of a medium or of a room, characterized in that, starting from the set value, the temperature below or above the set value which is reached by the unit after expiry of a preselected unit of time in each case is established repeatedly, these established temperatures are compared and that temperature which coincides with several previously measured temperatures is used for setting the temperature difference between cut-in temperature and cut-out temperature.

2. Process according to claim 1, characterized in that, at least upon new commencement of an operating period of the unit, once the set value has been reached, a time ($t_1$) is set running, after the expiry of which the temperature reached is tested, stored and the unit cut out, whereupon the unit is cut in again once the temperature to be monitored has reached or exceeded the set value with cut-out unit, in that, once the set value has been reached with cut-in unit, the preselected time (t) is set running again and, after its expiry, the temperature reached is inquired, stored and the unit cut out, the measured temperature ($T'_x$) being compared with the previously measured temperature ($T_x$), and in that these steps are repeated until a predetermined number of successive temperature values ($T_x$) is equal, whereupon the difference between this temperature ($T_x$) and the set value is determined and this temperature difference is maintained above and below the set value as cut-in temperature and cut-out temperature for the further operation of the unit.

3. Process according to claim 1, characterized in that, for the comparison of the measured temperatures ($T_x$), a tolerance range around the measured temperature value is preselected, within which range a once again measured temperature value ($T'_x$) is considered equal.

4. Process according to claim 1, characterized in that in each case three successively equal temperature values ($T_x$) are used for setting the temperature difference between cut-in temperature and cut-out temperature.

5. Prcess according to claim 1, characterized in that, with successively unequal temperatures ($T_x$), the last-measured temperature value is stored and the previously measured temperature value or values are erased, whereupon the cycle recommences with the last-measured temperature value.

6. Device for implementation of the process according to any one of claims 1 to 5, characterized in that an electronic control system with a memory, a timer and a comparison unit is provided, which is connected to a temperature sensor for the emission of electric signals and to a system for the cutting in and cutting out of the unit as a function of control signals from the control system.

* * * * *

UNITED STATES PATENT AND TRADEMARK OFFICE
CERTIFICATE OF CORRECTION

PATENT NO. : 4,934,593
DATED : June 19, 1990
INVENTOR(S) : Friedhelm Meyer It is certified that error appears in the above-identified patent and that said Letters Patent is hereby corrected as shown below:

Column 1, line 33, delete "process, by" and insert therefor --process by--.

Column 2, line 13, delete "$t_1$ time interval" and insert therefor --time interval $t_1$--.

Column 3, line 30, delete "to inquire" and insert therefor --to test--.

Column 3, line 35, delete "180 s," and insert therefor --180 seconds,--.

Column 4, line 32, delete "a".

Signed and Sealed this

Sixteenth Day of June, 1992

*Attest:*

DOUGLAS B. COMER

*Attesting Officer*     *Acting Commissioner of Patents and Trademarks*